Nov. 7, 1961
W. DEITERS ET AL
3,007,972
PROCESS FOR THE PRODUCTION OF MULTIVALENT
ALCOHOLS FROM SORBITOL
Filed Sept. 23, 1958
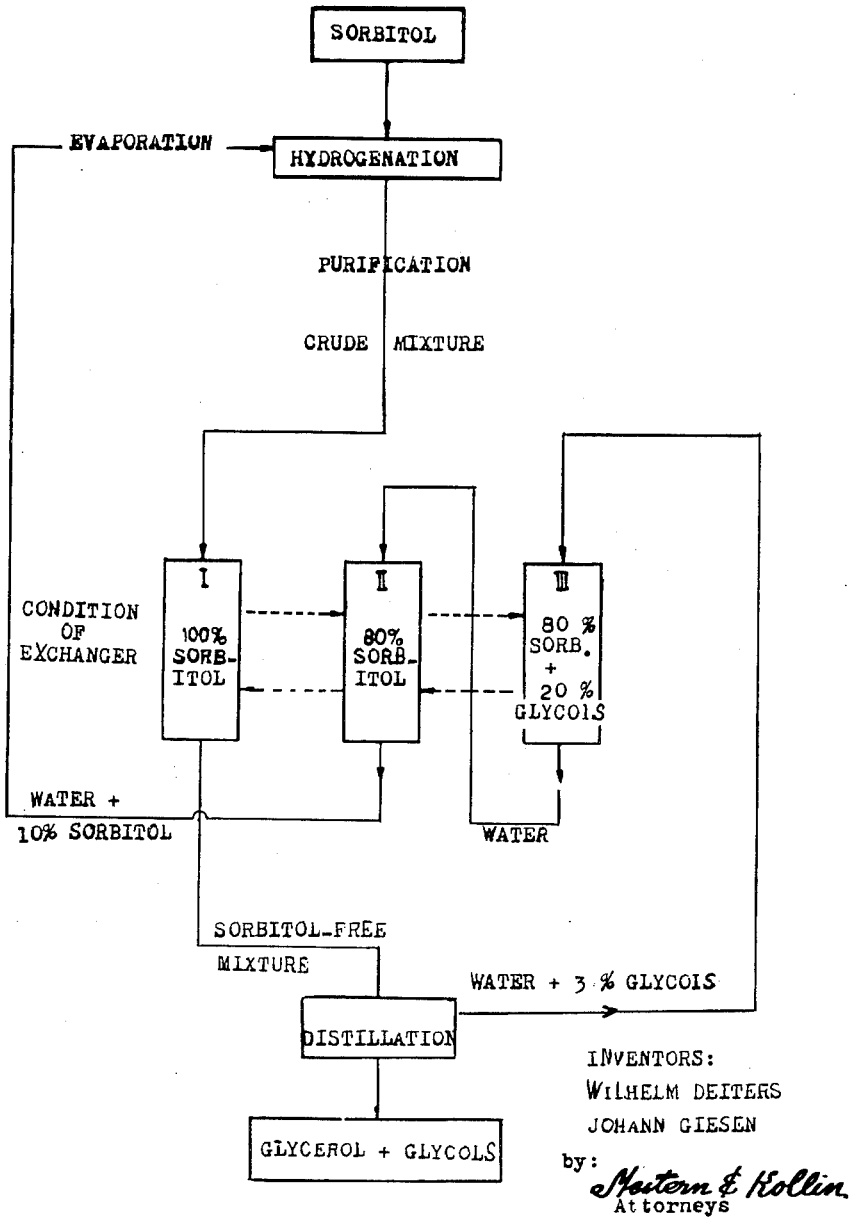
INVENTORS:
WILHELM DEITERS
JOHANN GIESEN
by: *Newton & Kollin*
Attorneys

United States Patent Office 3,007,972
Patented Nov. 7, 1961

3,007,972
PROCESS FOR THE PRODUCTION OF MULTI-VALENT ALCOHOLS FROM SORBITOL
Wilhelm Deiters, Chur, Graubunden, and Johann Giesen, Haldenstein, near Chur, Graubunden, Switzerland, assignors to Inventa, A.G. für Forschung und Patentverwertung, Zurich, Switzerland
Filed Sept. 23, 1958, Ser. No. 762,889
Claims priority, application Switzerland Oct. 29, 1957
3 Claims. (Cl. 260—635)

The present invention relates to the production of multivalent alcohols from sorbitol in aqueous solution by hydrogenation splitting in the presence of hydrogenation catalysts and at elevated temperatures and pressures.

The manufacture of multivalent alcohols, such as glycols and glycerol, by hydrogenation cleavage of sorbitol is known. Hydrogenation preferably is carried out at temperatures above 150° C. and at pressures of more than 100 atmospheres in the presence of hydrogenation catalysts known per se. This results in a complicated mixture of monovalent and multivalent alcohols which are difficult to fractionate by distillation.

According to the present invention, multivalent alcohols are prepared from aqueous solutions of sorbitol by hydrogenation cleavage at elevated temperatures and pressures in the presence of hydrogenation catalysts. A salient feature of the invention is the fact that no more than 70 percent of the sorbitol are subjected to hydrogenation splitting, followed by filtration of the reaction mixture, cooling and a treatment at 10 to 60° C. which consists of the following: The mixture is conducted over an anion exchanger which is impregnated with boric acid, whereby the unreacted sorbitol is adsorbed. The remainder is freed from water by distillation. Entrained in that water are glycols. The mixture now remaining contains multivalent alcohols which are recovered in a known manner by rectification. Of the sorbitol adsorbed on the exchanger, approximately 20 percent are recovered by washing with water. This solution is recycled to the hydrogenation. The water containing the glycols is condensed and is conducted, at 10 to 60° C., over the same anion exchanger from which part of the sorbitol had been removed. This exchanger now adsorbs the glycols. The latter then are displaced by sorbitol from a new hydrogenation mixture, and the exchanger again is fully loaded with sorbitol. The glycols thus displaced, together with a new glycol solution which is derived from a new hydrogenation mixture and which has passed through the ion exchanger without any glycol adsorption, are added to the distillation for the purpose of removing the water. The preferred hydrogenation catalyst is nickel.

It has been found that better yields of glycols and glycerol are obtained upon hydrogenation cleavage of sorbitol when no more than 70 percent of the sorbitol are reacted. The reaction mixture thus contains unreacted sorbitol which exerts an unfavorable influence on the separation of the reaction products by distillation because sorbitol decomposes in the still due to the high temperatures required for the separation.

The decomposition of sorbitol, according to the present invention, is avoided by its separation from the reaction mixture prior to further separation of the other ingredients. For that purpose, the mixture first is filtered at the highest possible temperatures and then is cooled. For the removal of acids which form in all instances, e.g., lactic acid, and of metal ions, the reaction mixture may be conducted over mixed-bed ion exchangers. The aqueous solution thus pre-purified then is conducted over an anion exchanger, impregnated with boric acid, at 10–60° C. This exchanger adsorbs practically all the sorbitol from the reaction mixture whereas glycerol and the glycols are practically not adsorbed as long as some sorbitol remains in the reaction mixture. The exchanger column is loaded with so much of the solution that the amount of sorbitol just suffices to load the exchanger to 100 percent of its capacity.

The exchanger loaded with sorbitol is washed partially with water. The solution should contain approximately 10 percent sorbitol. If necessary, this may be adjusted by concentrating the solution by evaporation. The solution then is recycled to the hydrogenation. The exchanger still containing part of the sorbitol is held in readiness for the process step described below. The sorbitol is washed off the exchanger only partially because a complete removal would require large amounts of water. This would yield very dilute solutions which must be concentrated before returning the sorbitol to the hydrogenation. This would render the process unduly expensive.

The water at first washes a comparatively large quantity of sorbitol off the fully loaded exchanger. However, with decreasing sorbitol present on the exchanger, the amount washed off per volume unit of water steadily decreases. Therefore, it is of advantage to wash only approximately 20 percent of the sorbitol off the fully loaded exchanger.

Approximately 80 percent of the water in the reaction mixture freed from sorbitol are removed by distillation. The remaining water also is distilled off in a subsequent operation whereby the water entrains increasing amounts of the glycols present, though not all of them. Preferably the distillation is carried out so that the water contains an average of 3 percent glycols. The vapors are condensed, cooled to 10 to 60° C. and conducted over the ion exchanger, which had been freed partially from sorbitol, for the purpose of recovering the glycols.

The ion exchanger, now loaded with sorbitol and glycols, is exposed to a fresh reaction mixture after the latter had been prepurified as described above. Thereby, the fresh sorbitol displaces the glycols from the exchanger. This means that the exchanger again is fully loaded with sorbitol which is removed and recycled as described. The glycols thus displaced, together with the other multivalent alcohols, are again subjected to distillation for the purpose of water removal. The mixture, freed from water, contains mostly glycerol, ethylene- and propylene glycol. The individual components can be separated by rectification.

It has been found that the use of three ion exchanger columns for the separation of sorbitol from the hydrogenation mixture and of glycols from the distillate water is particularly advantageous. Alternately sorbitol is partially washed off a fully sorbitol-loaded column and recycled to the hydrogenation, glycols from the condensed distillate water are absorbed by another column which is partially loaded with sorbitols and glycols, and from a third column, loaded with sorbitol and glycols, the glycols are displaced by sorbitol from the hydrogenation mixture and are combined with the other multivalent alcohols for removal of water by distillation. Each of the three ion exchanger columns alternately assumes one of the three functions.

It also has been found advantageous to subdivide the exchanger columns horizontally by mechanical means. This ensures that the liquids while flowing through the exchanger cannot form channels so that loading and washing take place uniformly. Also, by that means small portions of water may be added during washing without difficulty.

In that stepwise washing with small portions of water, a better equilibrium of the concentration of sorbitol in the water is attained. That concentration cannot be attained entirely by washing the sorbitol off an undivided tower.

The present invention will now be more fully explained with the aid of the attached flow sheet and the following examples. However, it should be understood that these are given merely by way of illustration, not of limitation, and that many changes may be made in the details without departing from the spirit of the invention.

*Example 1*

In a continuous high-pressure installation, a solution of 1,400 kg. sorbitol in 1,700 liter water per hour is subjected to hydrogenation cleavage in the presence of an activated nickel catalyst and at a temperature of 250° C. and 350 atmospheres pressure. The reaction mixture thus obtained is freed from the catalyst by filtration and is cooled to approximately 30° C. The contents are 1,700 liter water, 400 kg. sorbitol, 330 kg. glycerol and 500 kg. of a glycol mixture consisting mainly of approximately equal quantities of ethylene glycol and propylene glycol.

For the separation of the sorbitol from this mixture, 10 m.$^3$ of an anion exchanger are employed which previously had been activated by loading with 500 kg. boric acid in aqueous solution. The anion exchanger used is a polystyrene having quaternary ammonium groups (e.g., Permutit ES or Amberlite IRA 400, registered trade marks). The exchanger still contains 1,600 kg. sorbitol and 50 kg. glycols from the previous treatment.

As adsorption vessels, three equal towers serve, filled with the ion exchanger into which in regular cycles the process steps described above are carried out, i.e., loading with sorbitol, washing off the sorbitol with water, and loading with glycols.

After adsorption of the sorbitol, a solution flows off containing 330 kg. glycerol and 550 kg. glycols in 1,700 l. water which after removal of the water can be separated into the individual components by fractionated distillation.

The ion exchanger saturated with sorbitol as described above is regenerated from time to time by washing with water. Thereby, 400 kg. sorbitol in a 5.3 percent solution are obtained. This solution is concentrated to 45 percent by evaporation and returned to the sorbitol hydrogenation.

The water obtained in the distillation contains an average of 3 percent glycols. For their recovery the solution is conducted over the same ion exchanger after the latter had been regenerated with water. 50 kg. glycols are adsorbed whereas the water flowing off retains only approximately 0.1 percent. After that, the ion exchanger is used again directly for the separation of sorbitol from the hydrogenation mixture.

In this manner, a continuous production with continuous return of the unreacted sorbitol to the hydrogenation yields per hour 330 kg. glycerol and 500 kg. glycols from 1,000 kg. newly entered sorbitol. For the recovery of the glycols entrained in the water upon distillation the same ion exchanger is used which previously had served for the adsorption of unreacted sorbitol whereby the glycols, displaced in the course of the ensuing sorbitol loading operation, together with the glycerol mixture return to the distillation.

*Example 2*

In the same process as described in Example 1 the three single ion exchanger towers are replaced by towers each consisting of 10 single vessels on top of each other combined in cascade fashion and having the same total ion exchanger capacity as the single towers in Example 1. With that installation a sorbitol concentration of 10.2 percent in the wash-solution is attained. This means that a considerable part of the expenses for concentration by evaporation can be saved.

When such an exchanger column, loaded with sorbitol as described above, is subjected to an aftertreatment with a 40 percent sorbitol solution, more sorbitol is adsorbed. This is because the adsorptive capacity of the exchanger for sorbitol also depends upon the sorbitol concentration in the solution from which the sorbitol is adsorbed. From an exchanger, more fully loaded in this manner, a more concentrated sorbitol solution can be washed off.

We claim:

1. A process for the production of multivalent alcohols from sorbitol by catalytic hydrogenation cleavage of sorbitol in aqueous solution, at approximately 250° C. and approximately 350 atmospheres pressure, in contact with activated nickel as catalyst, which consists of subjecting only up to 70 percent of said sorbitol to said hydrogenation cleavage; followed by filtration, cooling and conducting of the reaction mixture thus obtained at 10 to 60° C. over an anion exchanger impregnated with boric acid, whereby unreacted sorbitol is adsorbed on said exchanger, to the latter's full capacity; removing the water from the remaining mixture of multivalent alcohols by distillation, whereby the distilling water entrains glycols; recovering from the mixture then remaining the multivalent alcohols present by rectification; washing approximately 20 percent of the sorbitol adsorbed on said exchanger off the same with water and returning the solution thus obtained to said hydrogenation cleavage; condensing the water from the distillation with entrained glycols and conducting the same at 10–60° C. over said exchanger which had been freed from approximately 20 percent of said sorbitol, whereby said glycols are adsorbed on said exchanger; displacing said glycols from said exchanger by conducting a fresh reaction mixture from said hydrogenation cleavage over said exchanger which again is loaded thereby to its full capacity with sorbitol; and combining said displaced glycols with the fresh reaction mixture from which said sorbitol had been adsorbed on said ion exchanger for distillation and removal of water.

2. The process according to claim 1, wherein said anion exchanger for the adsorption of sorbitol from the hydrogenation cleavage reaction mixture and for the adsorption of glycols from the distilled water in which it is entrained is contained in three columns, whereby alternately from one of these columns, fully loaded with sorbitol, approximately 20 percent of said sorbitol are washed off with water and returned to said hydrogenation cleavage; whereby on the second column, partially loaded with sorbitol, glycols are adsorbed from said condensed water with said entrained glycols; and whereby from the third column, loaded with sorbitol and glycols, the latter are displaced by sorbitol from fresh hydrogenation cleavage reaction mixture introduced, said displaced glycols being combined with said reaction mixture from which said sorbitol had been adsorbed and distilled for removal of water.

3. The process according to claim 1, wherein from said mixture containing said multivalent alcohols glycols are entrained in the water distilled in amounts of approximately 3 percent glycols in the water.

References Cited in the file of this patent

UNITED STATES PATENTS

| | | |
|---|---|---|
| 1,963,997 | Larchar | June 26, 1934 |
| 2,852,570 | Conradin et al. | Sept. 16, 1958 |
| 2,916,525 | Giesen et al. | Dec. 8, 1959 |

OTHER REFERENCES

Zill et al.: J. Am. Chem. Soc., vol. 75, pp. 1339–42 (1953).

Calmon et al.: Ion Exchangers in Organic and Biochemistry, pp. 412–413 (1957).